May 5, 1953  C. L. MARQUEZ, JR., ET AL  2,637,306
FLUID COOLED FURNACE
Filed Dec. 9, 1950  4 Sheets-Sheet 1

Charles L. Marquez, Jr.
Elias A. Kazmierski
INVENTORS

BY *J. P. Moran*
ATTORNEY

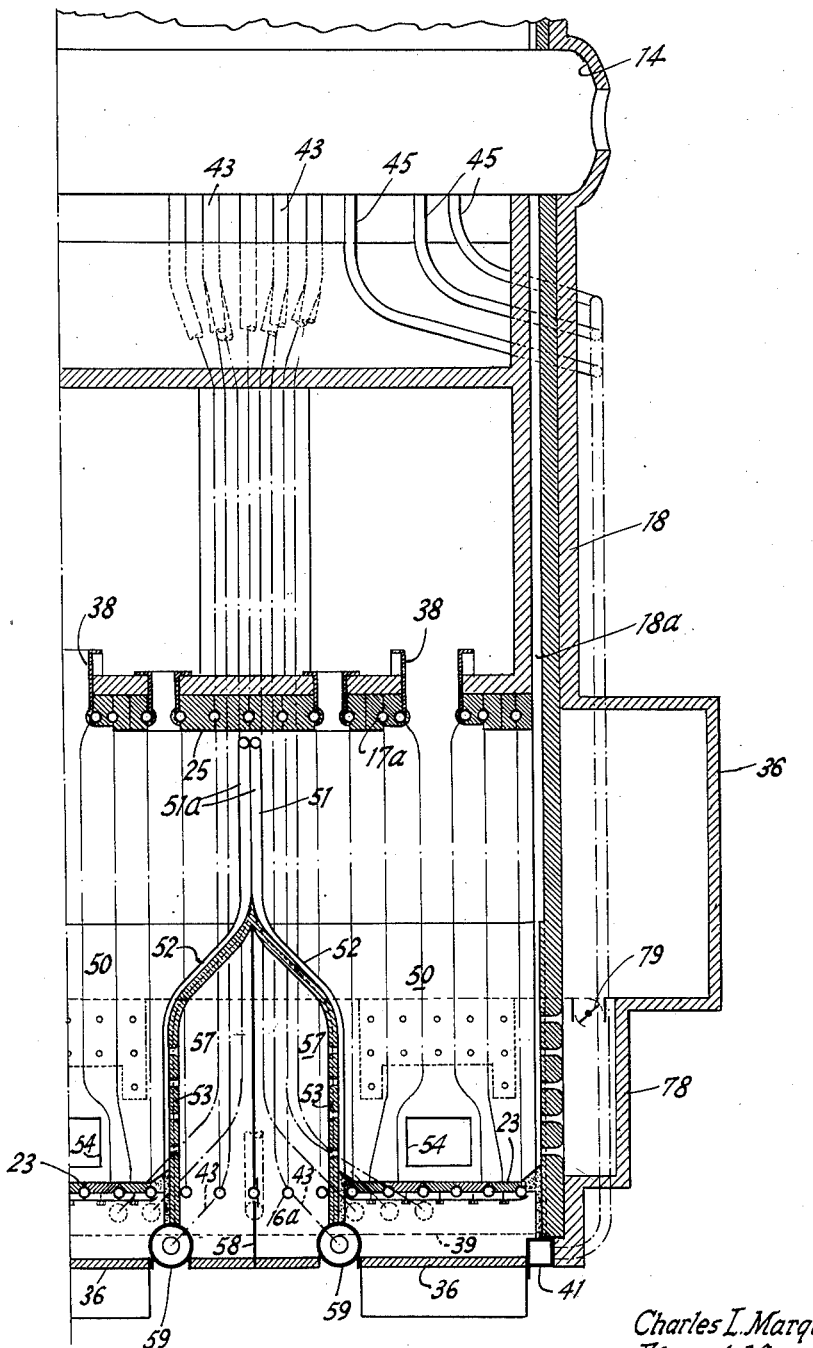
FIG. 2
Charles L. Marquez, Jr.
Elias A. Kazmierski
INVENTORS
BY 
ATTORNEY Charles L. Marquez, Jr.
Elias A. Kazmierski
INVENTORS

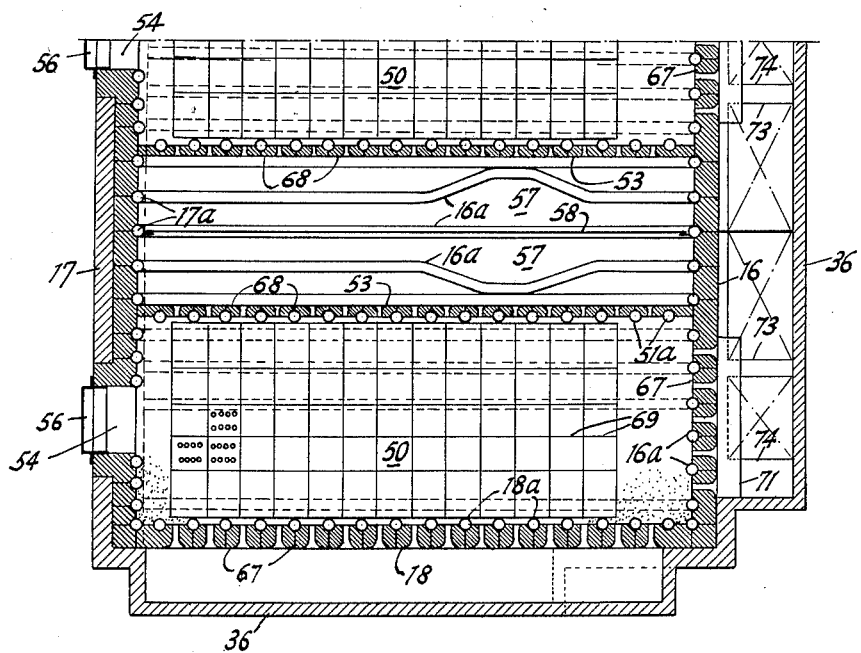
FIG. 4
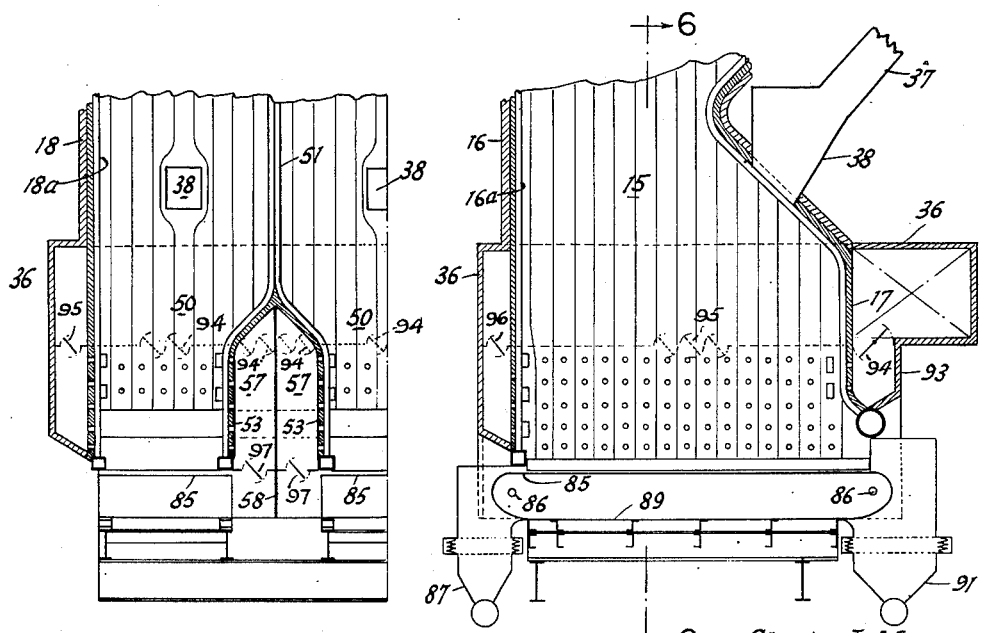
FIG. 6
FIG. 5
Charles L. Marquez, Jr.
Elias A. Kazmierski
INVENTORS
BY J. P. Moran
ATTORNEY

Patented May 5, 1953

2,637,306

UNITED STATES PATENT OFFICE 2,637,306

FLUID COOLED FURNACE

Charles L. Marquez, Jr., Jersey City, and Elias A. Kazmierski, Bernardsville, N. J., assignors to The Babcock & Wilcox Company, New York, N. Y., a corporation of New Jersey Application December 9, 1950, Serial No. 200,074

8 Claims. (Cl. 122—240)

The present invention relates in general to the construction and operation of a fluid cooled furnace having provision for the burning of fuel in a pile or bed of considerable depth at the bottom thereof and for the discharge of hot gases of combustion into contact with vapor generating surface. The furnace is especially arranged for burning fuels of a fibrous nature including, for example, various kinds of wood refuse such as hogged fuel, wood bark, slabs, shavings and sawdust and, in some instances, bagasse. The furnace combustion chamber is bounded by fluid cooled refractory walls and furthermore is laterally divided by upright fluid cooled walls so as to form a plurality of adjacent compartments or cells into each of which the fuel and air for combustion are separately delivered. Provision is made for directing air into each cell in combustion relationship to the pile of fuel substantially throughout the entire exposed periphery thereof. In one form of the invention, the combustible refuse is burned on a stationary floor and the ash removed through openings in lateral walls of the furnace whereas, in another form, the refuse is burned on a slow-moving continuous air-pervious conveyor whereby ash is continuously discharged from one end into an external ash disposal system.

All fluid cooled walls of the furnace, including the fluid cooled dividing walls or partitions between cells, are formed with wall cooling tubes which serve as vapor generating elements. Thus, in the disposal of large quantities of waste organic solids incidental to the manufacture of paper, for example, the provision of water cooled walls results in the refractory wall material being maintained at low enough temperature to resist the deleterious action of sand which may be present in the mass of wood refuse undergoing combustion. Furthermore, while the principal objective is the disposal of combustible waste materials, the provision of furnace walls having fluid conducting elements associated therewith affords a means for the economic generation of vapor at rates suitable for use in plant processes or in the production of power.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 2 is a one-half front sectional view, taken along line 2—2 of Fig. 1, showing details of the boiler-furnace structure;

Fig. 3 and Fig. 4 are one-half plan sections of Fig. 1 taken along line 3—3 and line 4—4, respectively;

Fig. 5 is a partial sectional side elevation showing a modified furnace construction; and Fig. 6 is a sectional end elevation, taken along line 6—6 of Fig. 5.

Figure 1:
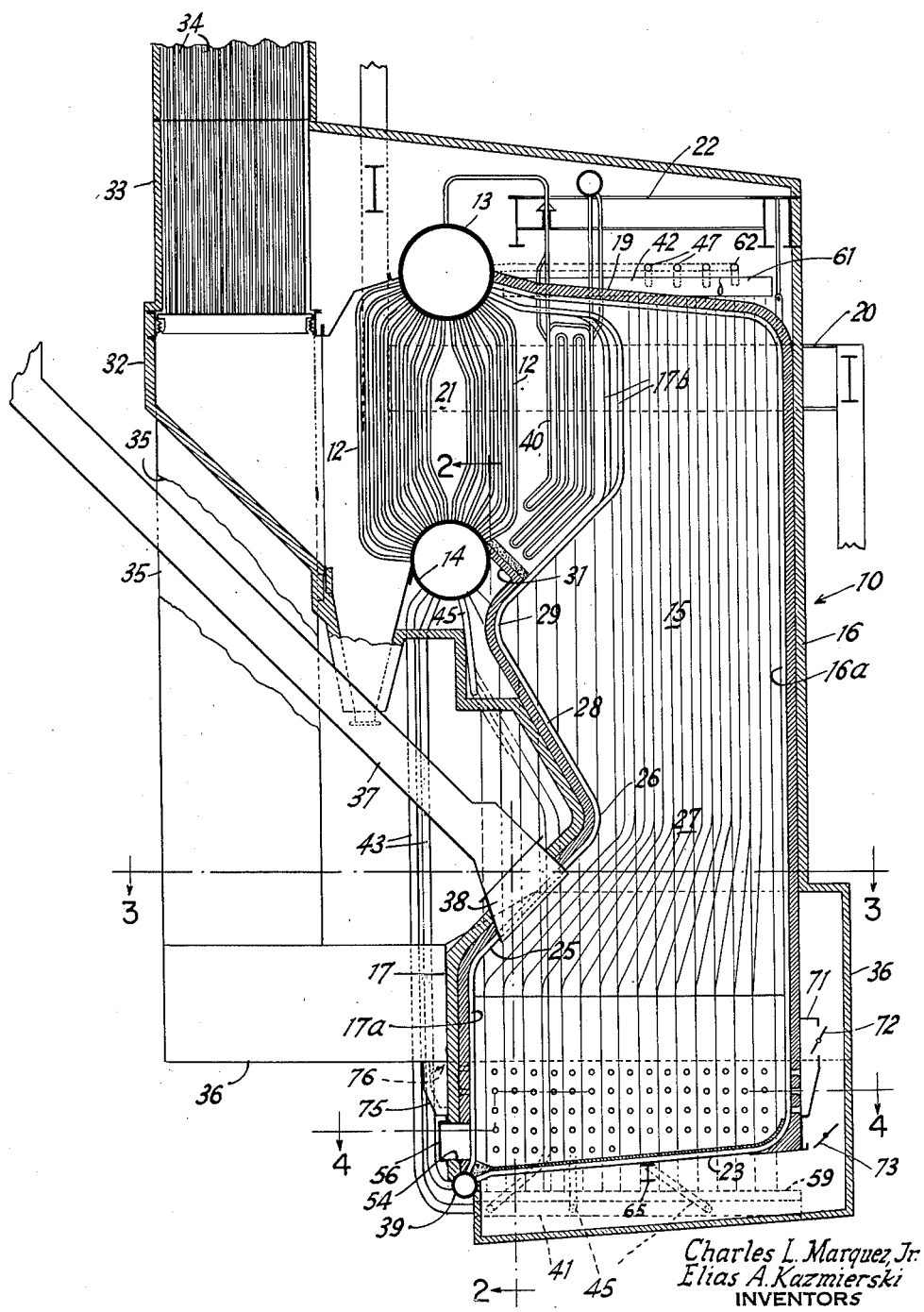
Fig. 1 is a side elevational view, in section, of a vapor generator embodying a fluid cooled furnace constructed in accordance with our invention.

In the illustrative embodiment of our invention, as shown in Figs. 1 and 2, for example, a wood-burning furnace 10 is arranged in association with a natural circulation boiler section comprising a bank or banks of upright tubes 12 having opposite ends connected to upper and lower drums 13 and 14, respectively. The furnace is formed of upright fluid cooled walls which define a combustion chamber 15 and which include a front wall 16, a rear wall 17, and opposing side walls 18, 18, the upper portion of front wall 16 being extended over the top of the combustion chamber to drum 13 and forming a roof 19. The rear wall 17 terminates adjacent the lower drum 14, in spaced relation to roof 19, so as to provide a gas outlet passage 21, between drums 13 and 14, through which gaseous products of combustion are discharged from chamber 15 and directed over boiler tubes 12. The bottom wall of the furnace is formed by a floor 23 which is inclined upwardly toward the front wall 16. The major part of the combined boiler and furnace assembly is suitably suspended from structural members herein indicated in part by beams 20 and 22.

The rear furnace wall 17 includes an intermediate section 25 which is inclined forwardly and upwardly toward the front wall 16 so as to form an arch above the lower rear portion of chamber 15. The arch 25 presents a convexedly curved nose portion 26 which, with front wall 16, defines a throat passage 27 of restricted area through which gases are directed into the upper part of the chamber. Above the arch nose 26, an upper rear wall section 28 extends rearwardly and upwardly toward the lower drum 14 to an elevation somewhat below the drum where the section is reversely curved as at 29 so as to extend forwardly of the drum. The space between the rear wall section 28 and lower drum 14 is closed by a relatively narrow flat rear wall section 31 so as to complete the lower boundary of the gas outlet passage 21 into the boiler section 12.

Beyond the boiler section, the gases are directed through a conduit means 32 leading to separate sections of an air heater 33 of which each section is formed with gas conducting tubes 34 over which the air to be heated is directed in successive passes. The heated air is discharged through horizontally spaced branch ducts 35 having their lower ends connected to a common manifold 36 from which the heated air is directed to various parts of the furnace, as hereinafter described.

Fuel is delivered to chamber 15 through arch 25 by means of a series of chutes 37 which are arranged at intervals across the width of the chamber, each chute having an upper connection to a source of fuel supply, not shown, and having its lower discharge portion or nozzle 38 directed downwardly toward the furnace floor 23 at a relatively steep inclination to the horizontal. Suitable means, not shown, are provided for regulating the rate of fuel delivery from the respective chutes, and also for preventing the escape of gases through the chutes during periods when no fuel is being fed to the furnace.

All boundaries of furnace 10 are fluid cooled by means of upright fluid conducting tubes associated with the respective walls and through which liquid is circulated in parallel with the natural circulation of liquid through boiler tubes 12.

The front furnace wall 16 and roof 19, together with floor 23, are cooled by tubes 16a having their lower ends connected to a header 39 located at the juncture of rear wall 17 with the lower end of floor 23. The upper ends of tubes 16a are connected to the upper boiler drum 13. In rear wall 17, the wall tubes 17a are connected at their lower ends to header 39 and at their upper ends to the upper boiler drum 13, the tubes 17a conforming to the varying contour of the wall, and having upper portions 17b arranged in staggered tube screen relation at a location forwardly spaced from the boiler tube bank 12. A superheater 40 having vapor inlet connections from the upper drum 13 is positioned intermediate the screen tubes 17b and the boiler tubes 12. In each of the side walls 18, the wall cooling tubes 18a are connected at their lower ends to a lower header 41 and at their upper ends to an upper header 42. Water is supplied to the lower, rear wall header 39 through selected tubes of the group of downcomer tubes 43, and to each lower side wall header 41 through downcomer tubes 45, all of which downcomer tubes 43 and 45 are connected at their upper ends to the lower boiler drum 14. The upper side wall headers 42 are connected to the upper drum 13 by suitably arranged riser tubes 47.

Figure 3:
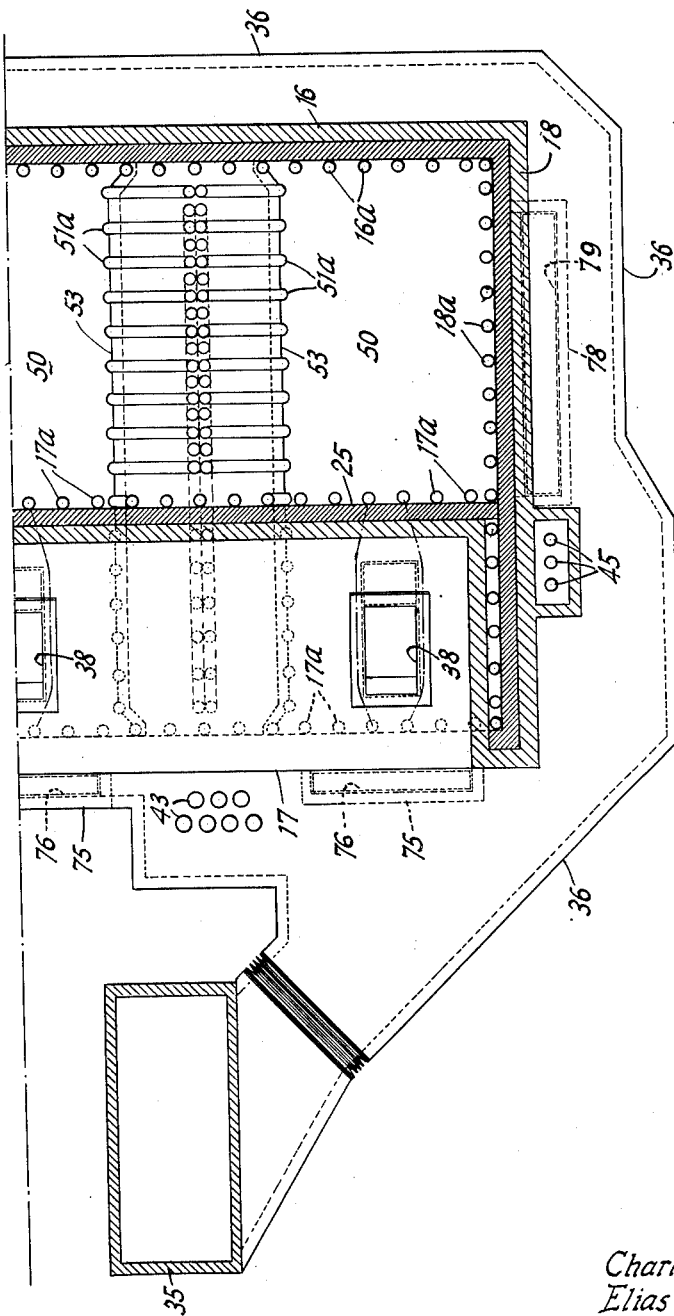

As seen in Figs. 2, 3, and 4, the combustion chamber 15 is divided into a plurality of adjacent fuel compartments or cells 50 by means of upright fluid cooled division walls 51 arranged parallel to side walls 18 and thus in transverse relation to boiler drums 13 and 14. In the lower part of the furnace, each division wall 51 is formed with integral lower portions 52 which diverge downwardly to form the side walls 53 of two adjacent fuel cells 50, with the cell walls 53 continuing downwardly to positions below the furnace floor 23. Fuel is delivered to each of the cells through the respective chute nozzles 38. A clean-out opening 54, having a door 56, is formed in rear wall 17 at the lower end of each cell. The side walls 53 of each two adjacent cells 50 also form the side walls of separate air compartments 57 located between adjacent cells, for a purpose hereinafter disclosed, the compartments having a common intermediate wall which is provided by a partition 58.

Each division wall 51 is formed with upright tubes 51a which extend throughout the height of the wall and furnace. The division wall tubes 51a are connected at their lower ends to lower headers 59 which are located at the lower ends of the cell walls 53, while their upper ends are connected to upper headers 61 which are located above the furnace roof 19. Water is supplied to the lower division wall headers 59 by the remaining downcomer tubes 43, as indicated in Fig. 2. The upper headers 61 are connected to the upper drum 13 by suitably arranged riser tubes 62 of which one is indicated in Fig. 1.

The division wall tubes 51a, in the lower part of the furnace, are arranged upright along the cell walls 53 in spaced vertical planes parallel to and between the front and rear furnace walls 16 and 17. At the top of the cells, at an elevation below arch 25, where the side walls 53 of adjacent cells converge, the successive division wall tubes 51a are directed at different inclinations toward front wall 16 so as to occupy the narrower space afforded by throat 27, the tubes 51a then continuing upwardly from an elevation opposite the arch nose 26 in parallel relationship throughout the remaining height of chamber 15, and at the horizontal spacings indicated in section in Fig. 3. The space remaining between each division wall 51 and the recessed portion 29 of rear wall 18 provides an additional area of intercommunication between the upper portions of adjacent combustion chamber compartments 50.

The furnace floor or hearth 23, at the bottom of each cell 50, is supported by means of a beam or other structural member 65 which extends transversely of the floor tubes 16a and is rigidly supported at its ends in suitable known manner on headers 41 and 59 to which the lower ends of side wall tubes 18a and division wall tubes 51a are respectively connected. The lower furnace structure is thus made integral and thereby is suspended a unit from its overhead support as previously described.

In order to provide for air delivery to the respective cells, the air manifold 36 is extended in suitable form to embrace all four walls of the combustion chamber 15, as illustrated for example in Fig. 3, and also extended to a position below the furnace floor 23, as indicated in Figs. 1 and 2. In addition, the lateral walls of the respective cells 50 are formed of perforated refractory blocks 67 and 68, of different thickness, fitted between adjacent tubes in the respective walls and suitably clamped to such tubes. The floor or hearth 23 is formed with perforated metallic blocks 69 fitted between adjacent floor tubes 16a and suitably clamped thereto.

At the front wall 16, a plurality of damper frames or boxes 71 are secured to the outer face of the wall so as to embrace perforated front wall areas open to the respective cells 50, the delivery of air being regulated by means of dampers 72. The delivery of air to compartments 57, between cells, is regulated by dampers 73, while delivery of air to the spaces below the respective cell floors is regulated by dampers 74, at approximately the elevation of dampers 73. At the rear wall 17, a plurality of damper boxes 75 are arranged to receive air from manifold 36 and to deliver air to perforated rear wall areas which are open to the respective cells 50, the delivery of air being selectively regulated by dampers 76. At each side wall 18, an extension of manifold 36 provides a damper box 78 which embraces a perforated side wall area open to the outer side of a side cell 50, the delivery of air to such side cell being regulated by damper 79.

The modification illustrated in Figs. 5 and 6 is similar to the embodiment hereinbefore described with reference to the general arrangement of cells 50 as a result of the partitioning of the furnace combustion chamber 15 by means of division walls 51. Similar parts are therefore identified by the same reference numerals employed in Figs. 1–4. Certain elements, not shown, such as the associated boiler section and the complete fluid circulatory system, are to be understood as being of substantially the same form and arrangement as previously described.

In this form of our invention, the refuse to be burned in each cell 50 is supported on the upper run of an endless air-pervious conveyor 85, supported on shafts 86, the conveyor being operated at a relatively slow rate so that ash is continuously discharged from one end in coordination with the rate at which combustion takes place whereby the ash is made available. It will be assumed that fuel is delivered to each conveyor at a location adjacent the rear wall 17 and that ash is continuously discharged from the top run at a location adjacent the front wall 16, the ash being discharged to ash disposal apparatus 87 of known type. The lower run of each conveyor is supported on a plate 89 whereby fuel siftings are moved rearwardly and discharged into a separate ash conveyor apparatus 91.

The air manifold 36 is arranged to receive preheated air within the portion adjacent the rear wall 17 and to deliver such air to various parts of the furnace at regulable rates. Accordingly, a manifold extension or damper box 93 is provided from which air is separately and selectively supplied to rear portions of the respective cells 50 and to the air compartments 57 intermediate the cells, the rate of air delivery being regulated by separate damper means 94. At opposite sides of the furnace, air is delivered to side portions of the outer cells 50 through side walls 18 at rates regulated by damper means 95. At the front wall 16, air is supplied to front portions of the respective cells at rates regulated by separate damper means 96. A portion of the air supplied to compartments 57 between cells, is delivered to spaces between upper and lower runs of the respective conveyors 85, at rates regulated by damper means 97.

Each of the foregoing furnace arrangements provides a structure adapted for operation at relatively high rates of combustion with high temperature air, but without necessitating undue maintenance of the furnace lining due to the fluid cooling provided. An additional advantage results from the multi-cell construction in that it enables a more intimate mixture of fuel and air to be effected, with the rates of fuel and air supplies continuously under control. Such a construction also permits selective operation of the separate cells, for inspection, or for cleaning, for example, without necessitating a shut-down of the entire unit. In the modification in which the refuse is supported and burned on a conveyor, a saving in labor is effected due to the ash being continuously discharged.

Furthermore, the combination of the furnace and vapor generating elements in a single unit results in a considerable reduction in the extent of floor area required for its installation as compared with refuse burning furnaces commonly employed.

While in accordance with the provisions of the statutes we have illustrated and described herein the best form of our invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. A vapor generator having a vertically extending furnace chamber, a vapor generating section receiving heating gases from the upper part of said furnace chamber, vertically extending vapor generating tubes lining the walls of said furnace chamber, means dividing the lower portion of said furnace chamber into a plurality of refuse burning cells comprising spaced rows of vapor generating tubes extending upwardly from the bottom of said furnace chamber and laterally bent towards each other, means forming refractory walls at the outer side of the spaced portions of said tube rows arranged to define opposite sides of a combustion air chamber between adjacent cells, said air chamber terminating in a closed upper end along which the laterally bent portions of said tube rows extend, air inlet ports in said refractory walls opening to said cells between tubes of said tube rows, and means for supplying combustion air to said air chamber.

2. A vapor generator having a vertically extending furnace chamber, a vapor generating section receiving heating gases from the upper part of said furnace chamber, vertically extending vapor generating tubes lining the walls of said furnace chamber, means dividing the lower portion of said furnace chamber into a plurality of refuse burning cells comprising spaced rows of vapor generating tubes extending upwardly from the bottom of said furnace chamber and laterally bent towards each other to define a tubular division wall dividing said furnace chamber substantially throughout its height, means forming refractory walls at the outer side of the spaced portions of said tube rows arranged to define opposite sides of a combustion air chamber between adjacent cells, said air chamber terminating in a closed upper end along which the laterally bent portions of said tube rows extend to form a continuing upper portion of said division wall, air inlet ports in said refractory walls opening to said cells between tubes of said tube rows, and means for supplying combustion air to said air chamber.

3. A vapor generator having a vertically extending furnace chamber, a vapor generating section receiving heating gases from the upper part of said furnace chamber, vertically extending vapor generating tubes lining the walls of said furnace chamber, means dividing the entire lower portion of said furnace chamber between opposite walls thereof into a plurality of refuse burning cells comprising spaced rows of vapor generating tubes extending upwardly from the bottom of said furnace chamber and laterally bent towards each other to define a tubular division wall dividing said furnace chamber substantially throughout its height, refractory walls at the outer side of the spaced portions of said tube rows arranged to define opposite sides of a combustion air chamber between adjacent cells, a vertical partition arranged to divide said air chamber into separate compartments, air inlet ports in said refractory walls opening to said cells between tubes of said tube rows, means for separately supplying combustion air to each of said chamber compartments, and means for separately regulating the supply of said air to the respective compartments.

4. A vapor generator having a vertically extending furnace chamber, a vapor generating section receiving heating gases from the upper part of said furnace chamber, vertically extending vapor generating tubes lining the walls of said furnace chamber, means dividing the lower portion of said furnace chamber into a plurality of refuse burning cells comprising spaced rows of vapor generating tubes extending upwardly from the bottom of said furnace chamber and laterally bent towards each other to define a tubular division wall dividing said furnace chamber substantially throughout its height and connected into said vapor generating section, said tubes defining said division wall having upper portions arranged with spaces therebetween providing intercommunication between furnace chamber portions at opposite sides, means forming refractory walls at the outer side of the spaced portions of said tube rows arranged to define opposite sides of a combustion air chamber therebetween, said air chamber terminating in a closed upper end along which the laterally bent portions of said tube rows converge upwardly, air inlet ports in said refractory walls opening to said cells between tubes of said tube rows, means for supplying combustion air to said air chamber comprising an air supply duct below said cells, and means for top-supporting said furnace chamber parts.

5. A vapor generator having a vertically extending furnace chamber, a vapor generating section receiving heating gases from the upper part of said furnace chamber, vertically extending vapor generating tubes lining the walls of said furnace chamber, means dividing the lower portion of said furnace chamber into a plurality of refuse burning cells comprising spaced rows of vapor generating tubes extending upwardly from the bottom of said furnace chamber and laterally bent towards each other to define a tubular division wall dividing said furnace chamber substantially throughout its height, means forming refractory walls at the outer side of the spaced portions of said tube rows arranged to define opposite sides of a combustion air chamber therebetween, said sides of said air chamber converging upwardly and forming a closed upper end, air inlet ports in said refractory walls opening to said cells between tubes of said tube rows, said ports being confined to elevations below said upwardly converging sides and means for supplying combustion air to said air chamber.

6. A vapor generator as claimed in claim 5 wherein one of said furnace chamber walls is formed as an arch through which combustible refuse is delivered to the respective cells and wherein each cell is formed above an air-pervious floor on which the refuse is supported and burned.

7. A vapor generator as claimed in claim 5 wherein said air-pervious floor is stationary and inclined downwardly toward the wall through which the combustible refuse is delivered.

8. A vapor generator having a vertically extending furnace chamber, a vapor generating section receiving heating gases from the upper part of said furnace chamber, vertically extending vapor generating tubes lining the walls of said furnace chamber, means dividing the lower portion of said furnace chamber into a plurality of refuse burning cells comprising spaced rows of vapor generating tubes extending upwardly from the bottom of said furnace chamber and laterally bent towards each other to define a tubular division wall dividing said furnace chamber substantially throughout its height, means forming refractory walls at the outer side of the spaced portions of said tube rows arranged to define opposite sides of a combustion air chamber therebetween, air inlet ports in said refractory walls opening to said cells between tubes of said tube rows, and means for supplying combustion air to said air chamber, each of said cells being formed above a movable air-pervious floor on which said refuse is supported and burned and from which ash is discharged exteriorly of said chamber.

CHARLES L. MARQUEZ, Jr.
ELIAS A. KAZMIERSKI.

References Cited in the file of this patent

UNITED STATES PATENTS

| Number | Name | Date |
|---|---|---|
| 1,050,253 | Thwaites | Jan. 14, 1913 |
| 1,792,068 | Caracristi | Feb. 10, 1931 |
| 2,057,622 | Webster et al. | Oct. 13, 1936 |
| 2,114,619 | Ward | Apr. 19, 1938 |
| 2,244,144 | Drewry | June 3, 1941 |

FOREIGN PATENTS

| Number | Country | Date |
|---|---|---|
| 13,661 | Great Britain | July 3, 1905 |